United States Patent
Whitener et al.

[15] 3,643,898
[45] Feb. 22, 1972

[54] METHODS AND MECHANISMS FOR STEERING TRUCK WHEEL AXLES BY A ROTATABLE TRUCK BEAM

[72] Inventors: Philip C. Whitener; Robert M. Weigel, both of Seattle, Wash.

[73] Assignee: The United States of America as represented by the Administrator of the Federal Aviation Administration

[22] Filed: Dec. 17, 1969

[21] Appl. No.: 885,772

[52] U.S. Cl. ..............................244/50, 280/81 R, 280/91, 280/111
[51] Int. Cl. .........................................................B64c 25/50
[58] Field of Search..............244/50, 103, 102; 280/81, 81 A, 280/87.04, 91, 99, 104.5, 111, 81 R, 87

[56] References Cited

UNITED STATES PATENTS

| | | | |
|---|---|---|---|
| 2,630,285 | 3/1953 | Geisse.................................. | 244/103 W |
| 2,687,857 | 8/1954 | Caldwell et al. ..................... | 244/50 |
| 2,848,245 | 8/1958 | Georgi.................................. | 280/81 A |
| 3,091,416 | 5/1963 | Knights et al........................ | 244/50 |
| 3,323,761 | 6/1967 | Copeland............................. | 244/50 X |
| 3,442,528 | 5/1969 | Rademacher........................ | 280/87.04 |

*Primary Examiner*—Milton Buchler
*Assistant Examiner*—Paul E. Sauberer
*Attorney*—Glenn Orlob, Kenneth W. Thomas and Theron H. Nichols

[57] ABSTRACT

Methods for steering a truck of wheels, particularly for a heavy vehicle, such as but not limited to aircraft, and mechanisms for carrying out the methods are disclosed comprising two fore-and-aft steerable axles on a truck beam and a truck beam actuator, the steerable axles being pivotally mounted on canted and eccentric ends on the truck beam and responsive to the truck beam actuator or rotation of the truck beam for being rotatable in a horizontal plane so that scrubbing of the tires is prevented and turning forces to steer the landing gear truck are substantially reduced.

Likewise, varying of the canting of the wheel axles' pivotal axes provides turning of all wheel axles about a common center of turning for prevention of skidding of the tires during turns on the ground.

Further, rotation of the truck beam about a tilted axis provides increasing of the steering angle of the truck wheel axles without increasing the truck size.

In addition, retraction of the truck of wheels into a smaller and shallower wheel well results from the eccentricity of the fore-and-aft axle bearings.

Dual usage of the truck beam rotating actuators results in both steering of the fore-and-aft truck wheel axles and for rotating the truck prior to retraction.

Likewise, single axle steering is obtained with a rotatable fore-and-aft extending eccentric shaft.

26 Claims, 15 Drawing Figures

INVENTORS:
ROBERT M. WEIGEL
PHILIP C. WHITENER
BY
Theron H. Nichols
AGENT

INVENTORS:
ROBERT W. WEIGEL
PHILIP C. WHITENER

INVENTORS:
ROBERT M. WEIGEL
PHILIP C. WHITENER
BY

Theron H. Nichols
AGENT

INVENTORS:
ROBERT M. WEIGEL
PHILIP C. WHITENER
BY
Theron H. Nichols
AGENT

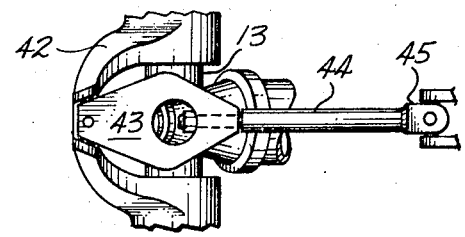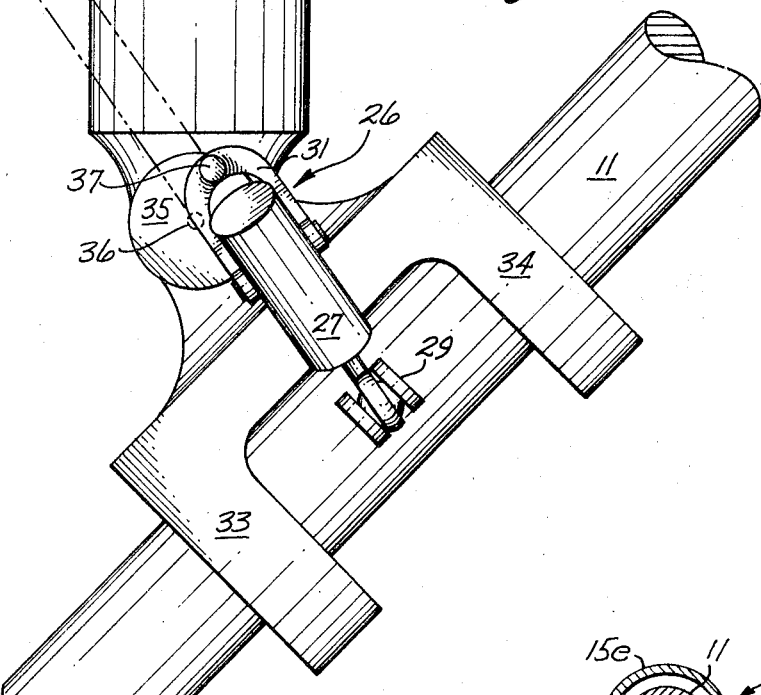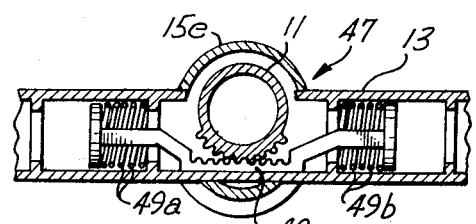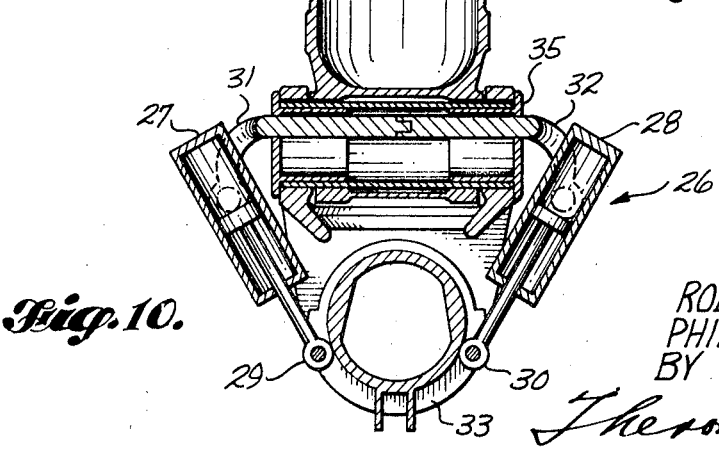

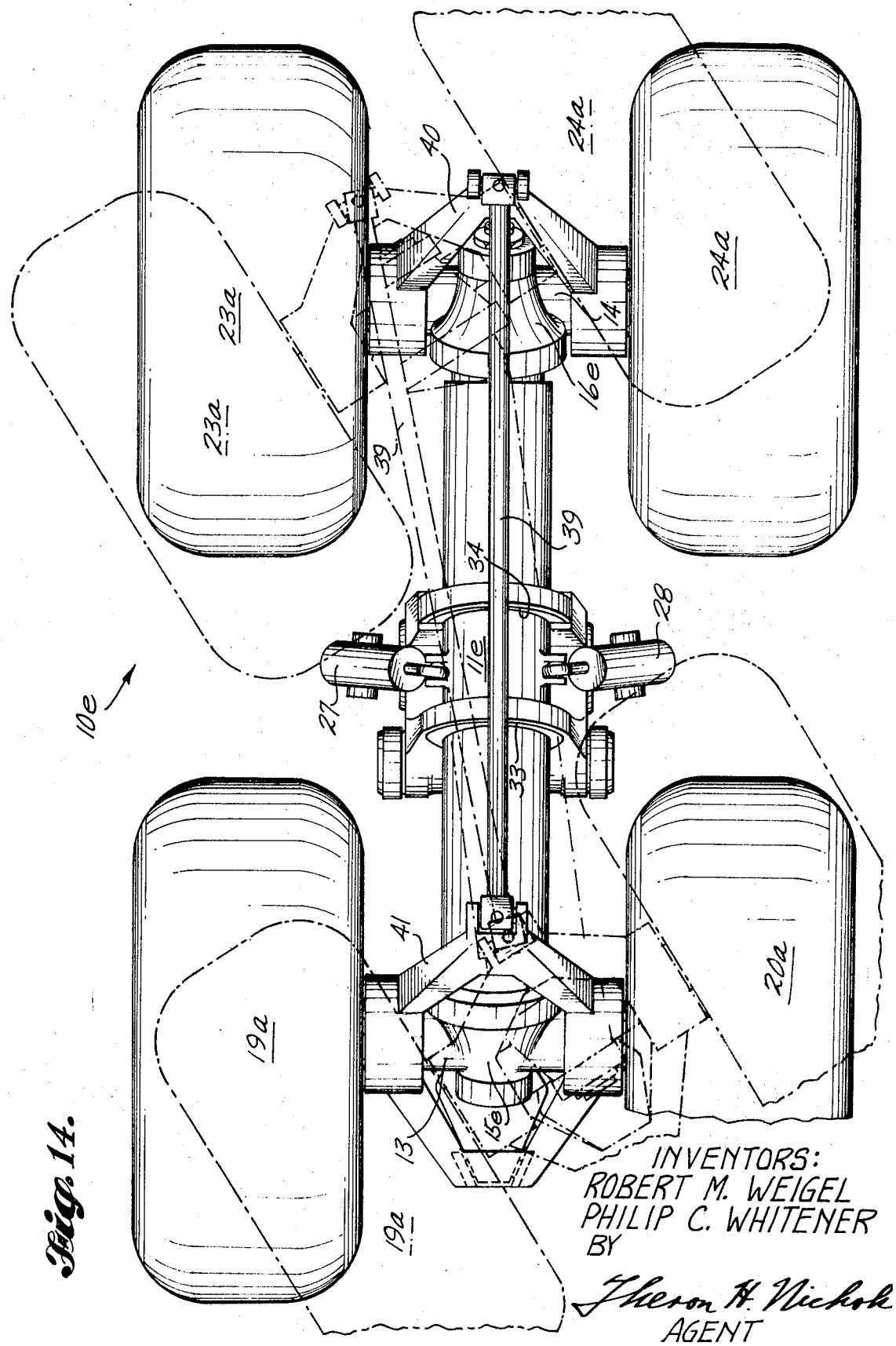

3,643,898

METHODS AND MECHANISMS FOR STEERING TRUCK WHEEL AXLES BY A ROTATABLE TRUCK BEAM

SUMMARY OF THE INVENTION

The disclosed invention is a steerable and a retractable multitruck landing gear for aircraft. The several trucks may be arranged in any desired configuration, such as but not limited to a staggered main landing gear as disclosed in assignee's patent application, Ser. No. 818,891, filed Apr. 24, 1969, by W. B. Fehring, et al., and now U.S. Pat. No. 3,511,456 comprising at least two steerable aft trucks and two fixed fore trucks of wider track.

A method for making a truck of wheels steerable wherein the truck comprises fore-and-aft wheel axis pivotally attached to the fore-and-aft ends of a longitudinal truck beam comprising (1) canting at least one of the fore-and-aft truck beam ends at an angle to the truck beam longitudinal axis, and (2) rotating the truck beam about its longitudinal axis for turning the axle on the canted truck beam end in a horizontal plane for steering the truck.

An additional method includes the step of canting both ends of the truck beam for turning both wheel axles in substantially the same direction for preventing skidding and scrubbing of the tires and for decreased turning forces.

As for embodiments for carrying out the methods, each aft or steerable truck in the above-described arrangement comprises an oleo strut, a longitudinally extending truck beam, a truck beam actuator for connecting the oleo strut to the middle of the truck beam for rotating the truck beam about its longitudinal axis in either direction and two steerable wheel axles, one axle pivotally mounted on a canted axis on each end of the truck beam and responsive to rotation of the truck beam by the actuator for being rotated in a horizontal plane without scrubbing of the tires and with little turning forces.

Likewise, both actuators of the truck beam actuator may be operated simultaneously to rotate the truck prior to or during retraction and accordingly save the weight of an actuating mechanism.

Further, decreased canting of the pivotal axis of each of the fore-and-aft wheel axles causes a greater degree of rotation of the truck beam than of the axles to accordingly provide increased turning forces at the wheel axles relative to the input forces at the actuator.

In addition the canting of the pivotal axes of the fore-and-aft axle bearings may be varied to cause the axes of both fore-and-aft wheel axles to intersect at the center of turning point to prevent skidding of the truck wheels during a turn of the aircraft while taxiing on the ground.

Also, the truck beam is rotatable by the truck beam actuator about a canted axis for increasing the steering angle of the truck wheel axles without increasing the size of the landing gear truck.

Additionally, the fore-and-aft axle bearings are eccentric to the wheel axles for permitting folding and retraction of the landing gear trucks into a smaller and shallower wheel well.

Accordingly, a principal object of this invention is to provide methods for steering a truck of wheels, particularly for a heavy vehicle.

Another principal object of this invention is to provide a multiwheeled truck in which the wheels may be easily turned prior to forward movement of the truck without skidding and scrubbing of the tires.

Yet another object of this invention is to provide a dual purpose actuator for an aircraft steerable retractable wheel truck which both steers the truck on the ground and rotates the truck during retraction thereof in the air.

A further object of this invention is to provide a wheeled truck that is indifferent to being moved either forwardly or rearwardly with neutral stability.

Another object of this invention is to provide a single-axle truck steerable by a rotatable eccentric longitudinal beam.

A further object of the invention is to provide a steerable landing gear multiwheel truck wherein forces at the wheel axles results from smaller input forces at the truck beam actuator, thereby requiring smaller actuators.

A still further object of this invention is to provide a steerable landing gear multiwheel truck wherein the amount of upward canting of the fore-and-aft axle bearings is varied to cause the axes of both fore-and-aft wheel axles to intersect at the center of turning point to prevent skidding of the truck wheels during a turn of the aircraft while taxiing on the ground.

Yet another object of this invention is to provide a landing gear steerable truck having a truck beam rotatable by an actuator wherein the axis of rotation of the beam is canted for increasing the steering angle of the wheel axles without increasing the size of the landing gear truck.

And still another object of this invention is to provide a steerable multiwheel truck having fore-and-aft wheel axles connected to a truck beam with axle bearings wherein the fore-and-aft axle bearings are positioned eccentric to their respective wheel axles for permitting folding and retraction of the landing gear trucks into a smaller and shallower wheel well.

Other objects and various advantages of the disclosed articulated steerable landing gear for heavy aircraft will be apparent from the following detailed description, together with the accompanying drawings, submitted for purposes of illustration only and not intended to define the scope of the invention, reference being made for that purpose to the subjoined claims.

BRIEF DESCRIPTION OF DRAWINGS

The drawings diagrammatically illustrate by way of example, not by way of limitation, five forms of the invention wherein like reference numerals designate corresponding parts in the several views in which:

FIG. 9 is an enlarged detailed side view similar to FIG. 8 illustrating the truck beam partially rotated for storage when retracted;

FIG. 10 is a vertical transverse section looking forward through the truck beam actuator of FIG. 8;

FIG. 12 is a view taken at 12—12 on FIG. 11;

FIG. 13 is a sectional view taken at 13—13 on FIG. 11;

FIG. 14 is a bottom view of the embodiment of FIG. 11, and

DESCRIPTION OF THE PREFERRED EMBODIMENTS

The invention, the scope of which being defined in the appended claims, is not limited in its application to the details of construction and arrangement of parts shown and described, since the invention is capable of other embodiments and of being practiced or carried out in various other ways. Also, it is to be understood that the phraseology or terminology employed herein is for the purpose of description and not of limitation.

This invention pertains to a steering mechanism for heavy vehicles requiring a minimum of weight and steering forces, such as but not limited to aircraft having a plurality of steerable wheel trucks, as the landing gear disclosed in assignee's above identified invention having both fore-and-aft main landing gear wheel trucks and wherein the aft wheel trucks are steerable, and a method for making multiple wheel trucks steerable.

More particularly, this invention comprises a new steerable wheeled support for a heavy vehicle, as an aircraft, comprising wheel trucks steerable by a rotating truck beam.

BASIC ROTATABLE TRUCK BEAM WITH CANTED ENDS

Figure 1:
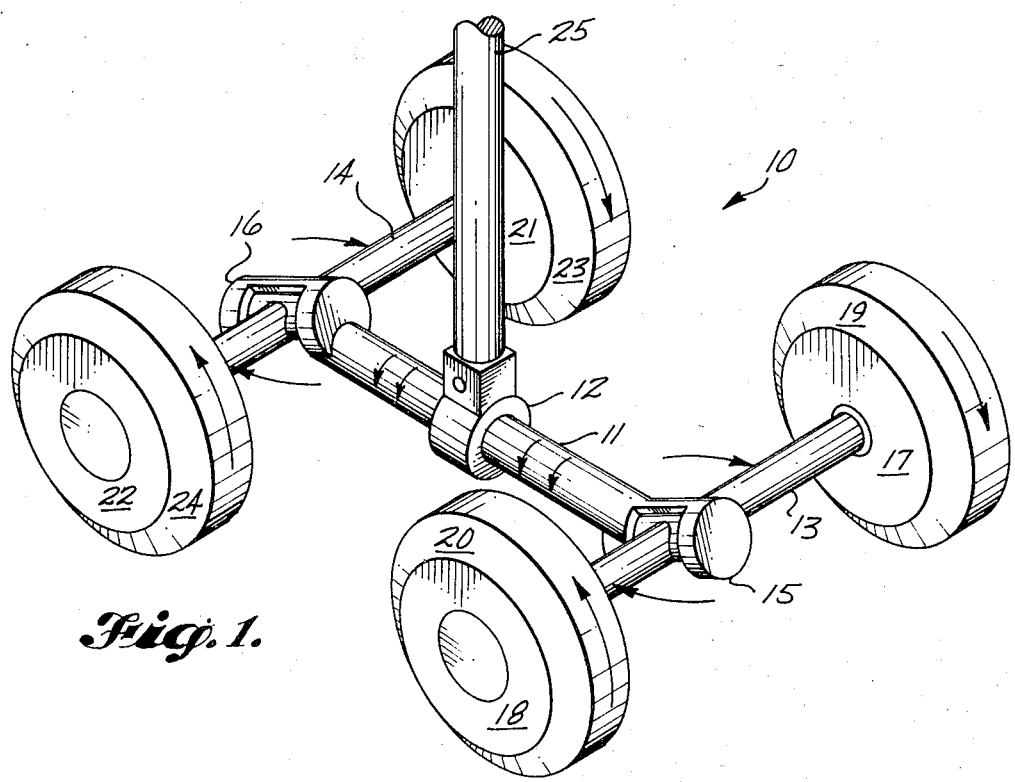
FIG. 1 is a perspective view of a schematic drawing of one embodiment of an aircraft landing gear wheel truck.

FIG. 1 discloses one embodiment for carrying out one of the methods comprising a steerable wheel truck 10 having a rotatable truck beam 11 which is rotated by a controllable truck beam bearing and actuator 12, and fore-and-aft wheel axles 13 and 14 respectively, pivotally connected to the fore-and-aft ends of the truck beam with canted fore-and-aft axle bearings 15 and 16, respectively. While both truck beam bearing and actuator are illustrated schematically as one device 12 in FIGS. 1—7, they are shown as individual mechanisms in greater detail in FIGS. 8—14. Truck fore axle 13 has two wheels 17 and 18 having tires 19 and 20, while aft axle 14 has two wheels 21 and 22 having tires 23 and 24. A conventional oleo strut 25 including torque links (not shown) is operatively connected and supported by the truck on the truck beam at the truck beam actuator 12.

In operation of the embodiment of FIG. 1 used as a steerable rear main truck of an aircraft multitruck landing gear as disclosed in the above identified patent application, as truck beam bearing and controllable actuator 12 (details illustrated and described in other modifications of this schematic illustration) rotates truck beam 11 in the direction of the arrows, the canted ends of the beam or bearings 15 and 16 swing in opposite directions to rotate their respective wheel axles in the same direction in a horizontal plane. This turning of the landing gear truck wheel axles merely rolls the wheels around prior to forward movement.

The angle of cant may be anywhere between the horizon and the vertical. With the angle of canting of the fore-and-aft axle bearings 15 and 16 being less than 45°, the amount of rotation of the truck beam 11 is greater than the amount of turning of the wheel axles to accordingly provide reduced actuating forces.

If so desired and if so required by the design requirements of the particular aircraft, only one of the axle bearings, 15 or 16 may be canted and accordingly turned upon rotation of the truck beam.

A further resultant feature of this truck is that it has neutral or bidirectional stability, i.e., the truck has no tendency to turn when moving in either direction. Thus, scrubbing of the tires is prevented as the aircraft is turned during taxiing and turning forces to steer the landing gear truck are reduced substantially, and accordingly skidding of the nose wheel is obviated.

Figure 2:
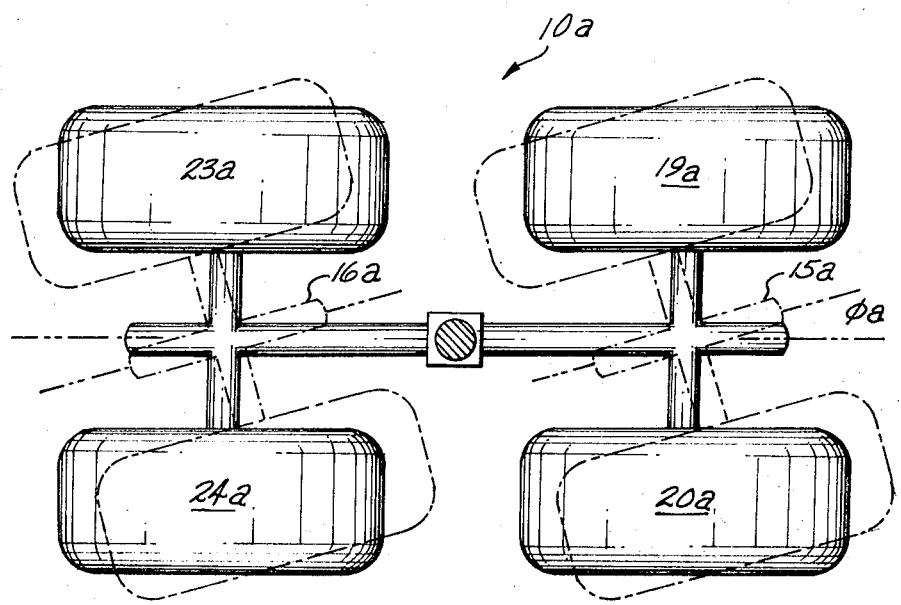
FIG. 2 is a top view of another schematic of the embodiment of FIG. 1.

FIG. 2 is a top view of a schematic of a steerable landing gear truck 10a similar to that of FIG. 1, but with the oleo strut cut away for clarity of disclosure and showing the utilization of wide pneumatic tires 19a, 20a, 23a and 24a.

Angle $\phi_a$ indicates the amount of turning by the fore axle bearing 15a from the longitudinal axis of the truck beam as the latter is rotated about its axis. The aft axle bearing 16a is canted a similar amount.

Figure 3:
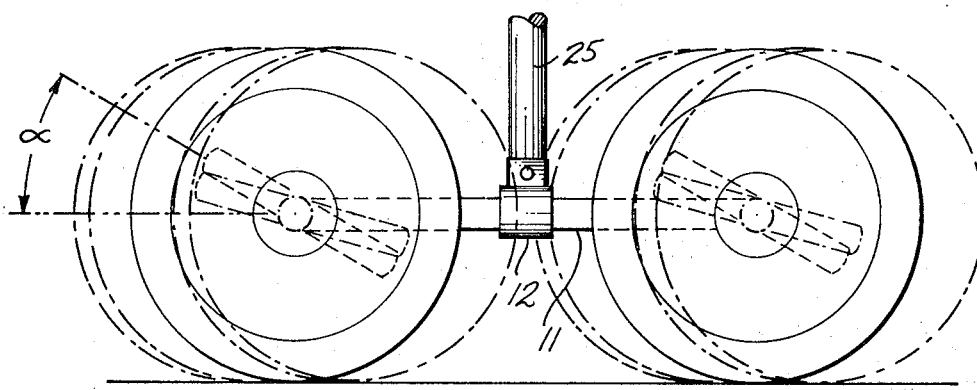
FIG. 3 is a side view of the wheel truck of FIG. 2.

FIG. 3 is a side view of the wheel truck of FIG. 2 illustrating in broken lines the position of the wheels and the axle bearings during a turn while taxiing on the ground. Here the maximum angle $a$ of cant of both fore-and-aft wheel axles are equal and occurs when the wheels are steered straight forward.

For crosswind landings, all trucks of the main landing gear would be composed of the trucks of FIGS. 1, 2 and 3, wherein the angles of cant of both axle bearings are equal.

MODIFICATION SHOWING TRUCK BEAM WITH TILTED AXIS

Figure 4:
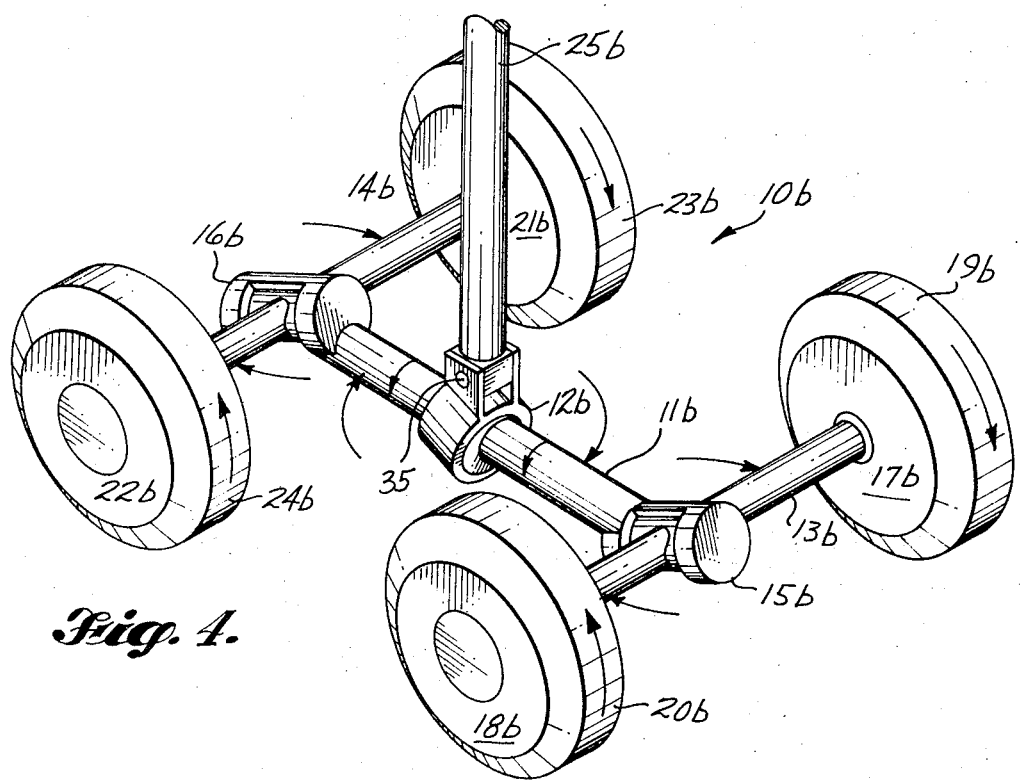
FIG. 4 is a perspective view of a schematic drawing of a modification of the wheel truck of FIG. 1.

FIG. 4 illustrates schematically a modification of FIG. 1 in the form of steerable landing gear truck 10b, wherein tilting of the axis of truck beam 11b is accomplished in its truck beam bearing and actuator 12b (more details shown in other modifications hereinafter).

A pivot 35 connecting the bearing and actuator 12 to the lower end of the oleo strut permits the slight rocking movement required of the truck beam 11b as the beam rotates for steering.

Figure 5:
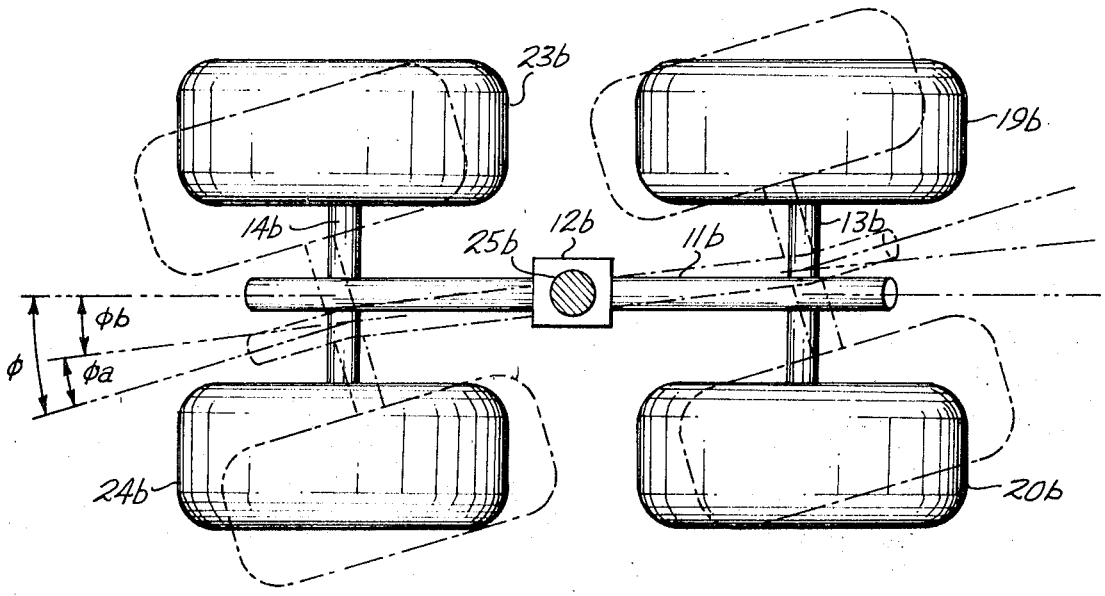
FIG. 5 is a top schematic view of a modification of the wheel truck of FIG. 2 similar to the FIG. 6 embodiment.

FIG. 5 is a modification of FIG. 2 using the feature of FIG. 4 of the tilted axis truck beam 11b and illustrates the position assumed by the truck beam during a turn having the tilted axis of rotation. This feature increases the steering angle of the truck and is illustrated in greater detail in modifications disclosed hereinafter.

The fore axle bearing angle $\phi$, FIG. 5, which is the total amount of resultant turning of the fore wheel axle comprises the sum of angle $\phi_b$ due to the tilt of the truck beam axis and angle $\phi_a$ due to canting of the axle bearing. Here, the wheels roll from the solid line position to the broken line position upon rotation of truck beam 11b prior to forward movement.

MODIFICATION SHOWING THE ECCENTRIC AXLE BEARING

Figure 6:
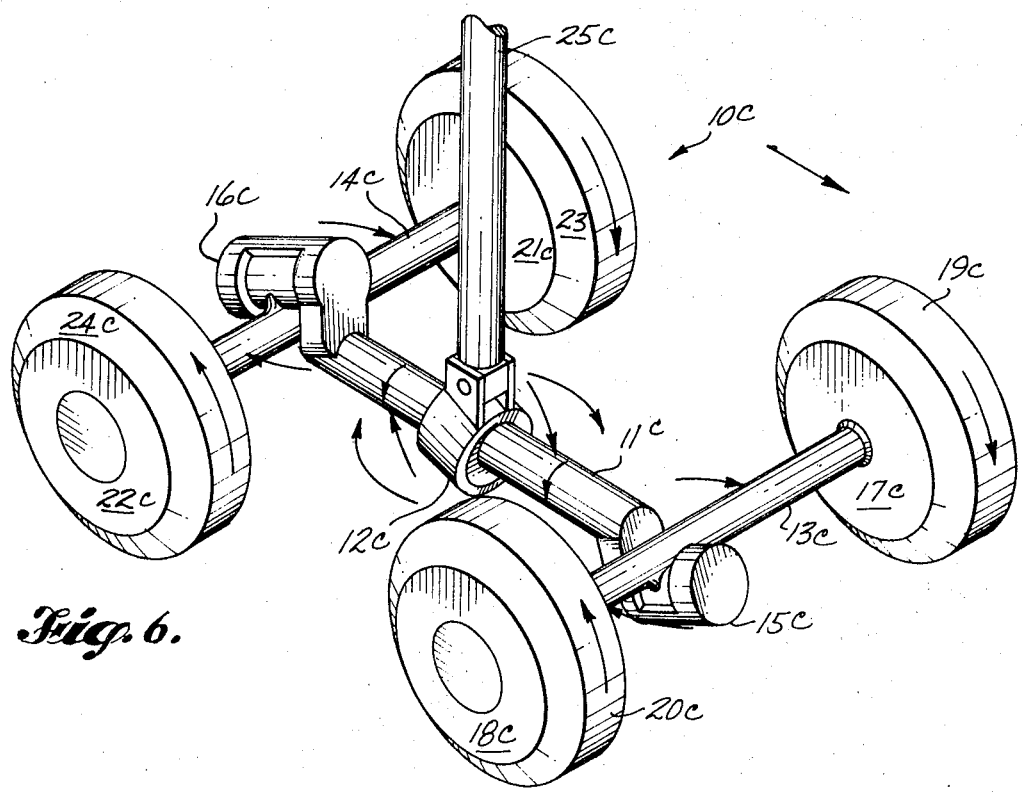
FIG. 6 is a perspective view of a schematic drawing of another modification of the wheel truck of FIG. 1.

FIG. 6 is another modified steerable truck beam 10c having all the characteristics of FIG. 4 including the tilted axis truck beam 11c with the additional feature of the fore-and-aft axle bearings, 15c and 16c, being offset under and over the fore-and-aft wheel axles, 13 and 14 respectively, in an eccentric manner. The result is a more compact landing gear when retracted as illustrated in greater detail in the last modification of FIG. 11, the compact retracted landing gear thus requiring a smaller and shallower wheel well.

Figure 7:
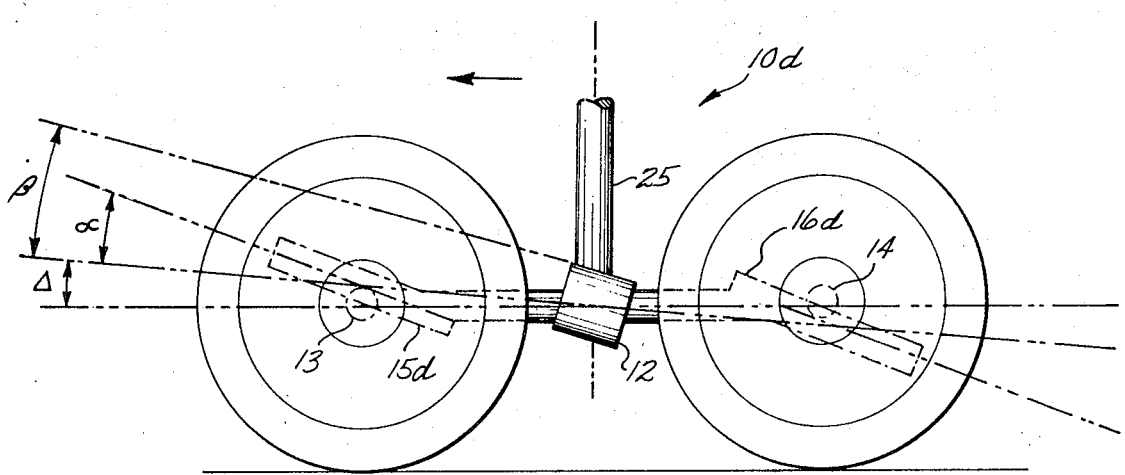
FIG. 7 is a side view of a modified wheel truck similar to that of FIG. 6.

FIG. 7 is a side view of a steerable wheel truck 10d similar to that of FIG. 6 except showing the oleo strut folded down close to the wheel axle 14. The steering forces resulting from the eccentricity of the axle bearing 16d are cancelled by an equal and opposite eccentricity of the axle bearing 15d.

Figure 8:
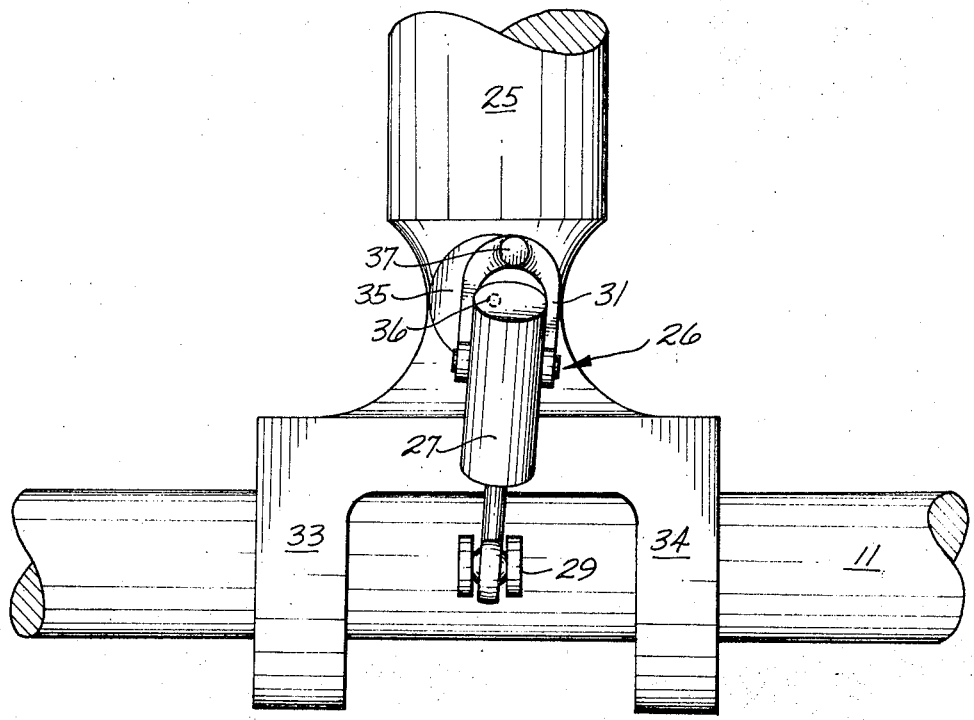
FIG. 8 is an enlarged detailed side view of the dual purpose truck beam actuator for use on the modification of FIG. 11.

FIGS. 8–10 are detailed illustrations of a dual purpose truck beam actuator 26 for rotating the truck beam 11 of the embodiments of FIGS. 1–3 wherein no tilt of the truck beam is utilized.

The truck beam controllable actuator assembly 26, FIGS. 8–10, comprises left and right dual purpose hydraulic actuators 27 and 28, FIG. 10 particularly, universally connected between ball joints 29 and 30 on truck beam 11 and swivelably interconnected yokes 31 and 32, both actuators 27 and 28 having suitable hydraulic supply and control lines (not shown).

For rotation of the truck beam 11 in truck beam bearings 33 and 34, FIGS. 8 and 9, the actuators 27 and 28 are operated differentially or oppositely, i.e., for rotating the beam 11 FIG. 10, clockwise, hydraulic actuator 27 is contracted and actuator 28 is expanded.

Truck beam bearings 33 and 34, FIGS. 8–10 are pivotally connected to the lower end of the oleo strut 25 with transverse pivot 35 having a center 36, FIGS. 8 and 9, and the interconnected yokes 31 and 32, FIG. 10, pivot about the lower end of the oleo 25 to form an offset pivot about point 37, FIG. 9. Pivot 35 is operable in the lower end of strut 25. Thus with simultaneous contraction of both hydraulic actuators 27 and 28, truck beam 11, its bearings 33 and 34, and all axles and wheels carried thereby are rotated to a position parallel with oleo strut 25 upon retraction of the oleo strut by suitable retracting mechanism (not shown). Accordingly, dual usage of the truck beam rotating actuators provides rotation of the truck prior or during retraction as well as steering of the fore-and-aft truck wheel axles.

MODIFICATION SHOWING THE VARIED WHEEL AXLE CANT

FIGS. 11-14 illustrate an embodiment including all the features of the prior modifications with the added feature of slightly increasing the degree of cant of the aft axle bearing 16e over the amount of cant of the fore axle bearing 15e. The resultant increased turning of the aft wheel axle over the fore wheel axle until the axis of each axle intersects the nose wheel axis at a common center of turning insures the prevention of skidding of the tires during turns on the ground as illustrated in assignee's U.S. Pat. application Ser. No. 655,819 filed July 25, 1967, by F. W. Scherer, and now U.S. Pat. No. 3,488,020 having steerable aft main landing gear trucks.

Figure 11:
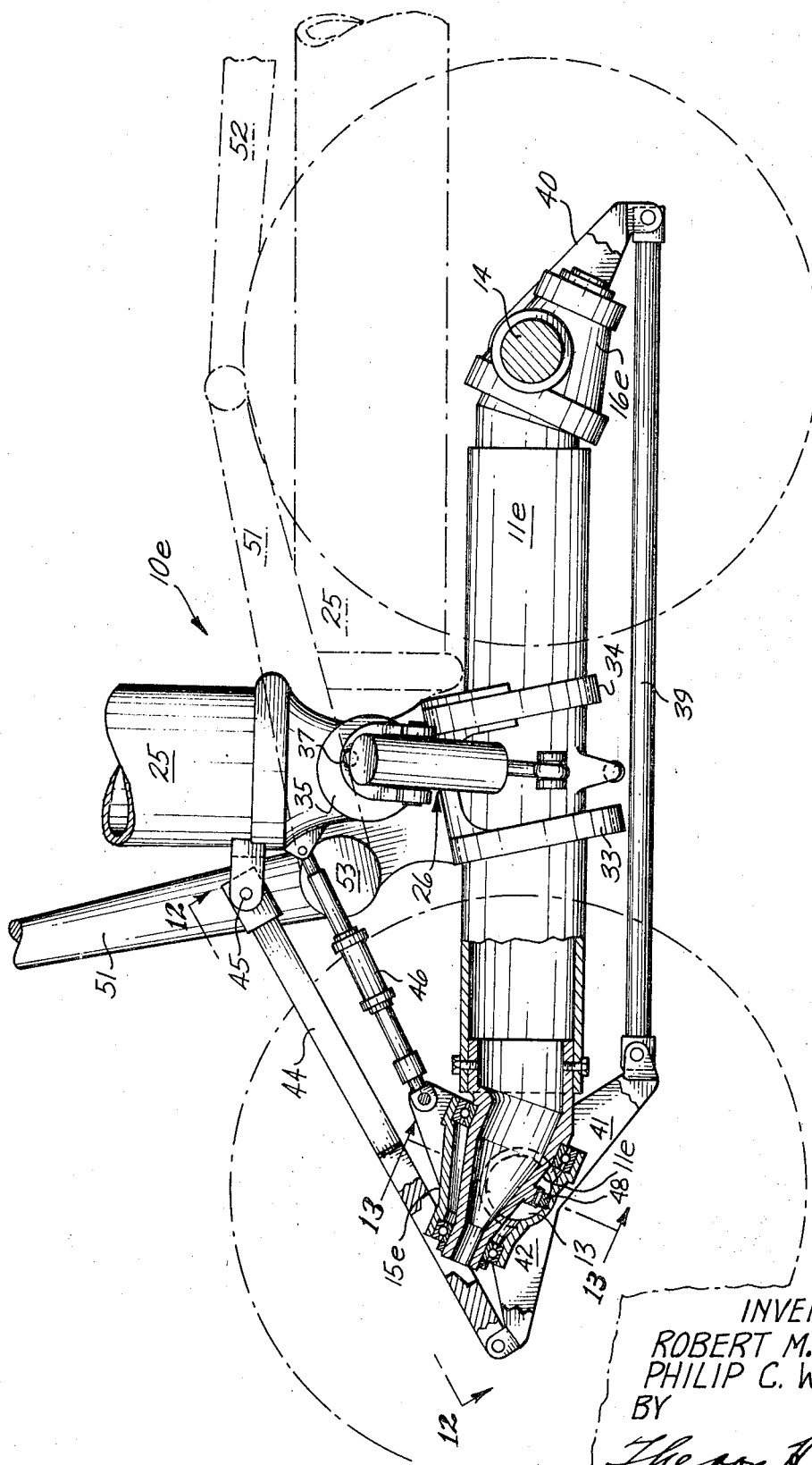
FIG. 11 is a schematic side view of a modification similar to that of FIG. 6, but with parts in section.

FIG. 11, a side view of a typical and a preferred embodiment, illustrates truck 10e comprising truck beam 11e with the canted fore-and-aft axle bearings 15e and 16e connected to fore and aft wheel axles 13 and 14, the truck being rotatable in tilted bearings 33 and 34 about tilted axis 38 by dual purpose truck beam controllable actuators 26.

A conventional brake equalizer rod 39, FIG. 11, interconnects with universal joints two fore-and-aft brake yokes or bellcranks 41 and 40 freely and pivotally supported on the fore-and-aft axles 13 and 14, respectively. Bellcranks 40 and 41 are rigidly attached to brake reaction members (not shown) in each wheel. Fore bellcrank 41 has a forwardly extending arm 42 to which is connected a brake reaction link 44 by universal joint 43, FIG. 12. A second universal joint 45, FIG. 11, connects the brake reaction link 44 to the strut 25. FIG. 11 discloses further a conventional snubber 46 interconnected with universal joints between truck fore axle bearing 15e and the oleo strut 25.

Conventional scissors links 51, 52 are connected with pivot 53 to the lower end of oleo 25.

For retraction, both actuators 26, FIGS. 8, 9 are contracted simultaneously, and since their pivot 37 is offset from the truck beam pivot 36, the truck beam 11 retracts to the broken line compactly retracted position illustrated in FIG. 11.

FIG. 12, a view taken at 12-12 on FIG. 11, illustrates details of the brake reaction link 44 connected between universal joints 43 and 45.

FIG. 13, a sectional view taken at 13-13 on FIG. 11, illustrates the centering spring cartridge 47 inside wheel axle 13 comprising rack 48 mounted between two centering springs 49a and 49b for centering the axle 13. Accordingly, the fore wheel axle 13 always tends to rotate to the position desired for stowage when not overcome by ground contact forces.

Likewise, axle 14 is similarly centered.

FIG. 14, a bottom view of FIG. 11, the preferred wheel truck 10e is steerable by the rotating truck beam illustrated in straight ahead position in solid lines and illustrated in turning positions in broken lines. Brake equalizer rod 39 is illustrated interconnecting bellcranks or fore-and-aft yokes 41 and 40. Likewise, the turning of fore-and-aft truck tires 19a, 20a, 23a and 24a is illustrated by rotating truck beam 11e in truck beam bearings 33 and 34 with truck beam dual purpose actuators 27 and 28.

Another feature of this invention is the articulation of the wheel truck axles on the truck beam. Upon one tire of a conventional four wheel truck going flat, the extra load is assumed by the tire on the other end of the axle from the flat tire and which after causes it also to blowout. However, when our truck has a flat tire, the axle merely rotates on the truck beam, permitting the wheel to continue to carry its load without loading up the adjacent tire.

The disclosed methods of making the truck steerable comprise canting either one of or both of the fore-and-aft truck beam ends at an angle to the truck beam longitudinal axis and then rotating the truck beam about its longitudinal axis for turning the fore-and-after axles in a horizontal plane for steering the truck.

A third method comprises rotating the truck beam about an axis tilted from the truck beam longitudinal axis for increasing the steering axle of the canted wheel axle without increasing the size of the truck.

The aft axle bearing 16e, FIG. 11, is illustrated as being eccentrically located on the lower side of the aft axle 14 to provide compact folding with the oleo strut 25 when retracted forwardly and the fore axle bearing 15e is above its axle 13 for symmetry. However, for rearwardly retracting wheel trucks wherein the strut 25 overlies the fore axle bearing 15e, then the eccentricities of the fore-and-aft axle bearings may be reversed to accomplish the purposes intended.

Figure 15:
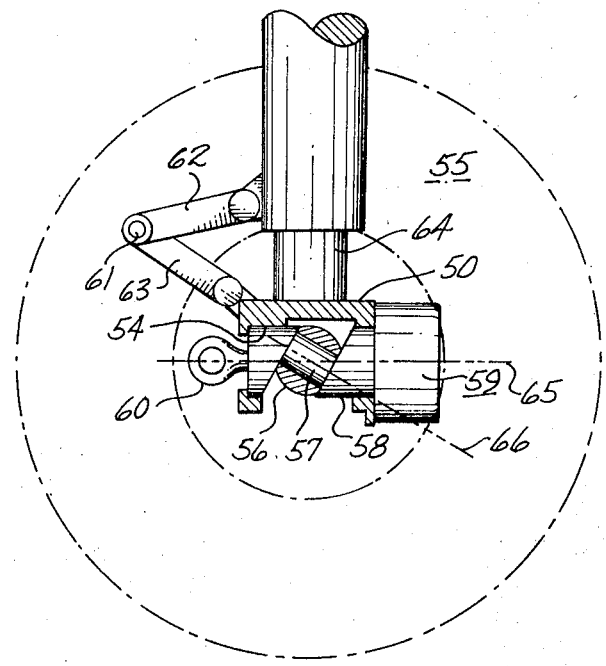
FIG. 15 is a sectional view of a dual nose wheel modification steerable by a rotatable eccentric longitudinal beam.

FIG. 15 discloses a modification of the basic invention comprising a dual wheel truck or housing 50 having a longitudinal hollow bearing 54, such as but not limited to use as dual nose wheels of an aircraft landing gear. Nose wheels 55 are mounted on a transverse axle similar to axle 13 of FIGS. 11-14, except having an eccentric bearing 56 which is rotatable in a horizontal plane about eccentric shaft 57 on longitudinal beam 58 rotatable in bearing 54 by controllable actuator 59. Eccentric axis 66 of eccentric bearing 56 is tilted or canted at an angle to longitudinal axis 65 of the longitudinal beam 58 for causing the transverse axle to rotate with rotation of the beam 58 by actuator 59.

For steering of the dual nose wheels of FIG. 15, actuator 59 is rotated to either the right or left to turn the transverse axle and the wheels 55 thereon in a horizontal plane about the transverse axle eccentric bearing 56 to either the right or left, depending upon the direction of cant being upward or downward. For towing of the aircraft by the landing lug 60, pin 61 is first removed from the torque links 62, 63 to enable the lower oleo strut 64 to rotate freely.

Accordingly, new methods for making a multiwheeled truck steerable in response to rotation of the truck beam and new embodiments for carrying out the methods have been disclosed.

In operation of the disclosed steering mechanism or heavy aircraft landing gear trucks, for example, by a rotatable truck beam, the two wheel axles on the canted ends of the truck beam are rotated for steering by the rotatable truck beam so that scrubbing of the tires is prevented and turning forces to steer the landing gear truck are substantially reduced. As illustrated in FIGS. 5 and 14, rotation of the truck beam about a tilted axis increases the steering angle of the truck wheel axles without increasing the truck size. FIGS. 8-10 illustrate how equal and opposite actuation of the dual purpose truck beam actuators rotates the truck beam about a longitudinal axis for steering of the truck and equal and simultaneous actuation of the actuators retracts the wheel truck.

Retraction of the truck of wheels into a smaller and shallower wheel well results from the eccentricity of the fore-and-aft axle bearings, FIGS. 6 and 11. Also, the disclosed embodiment of FIGS. 11-14 has a variation of the amount of cant between the fore and aft axle bearings whereby turning forces are varied for easier steering as well as turning of all wheel axles about a common center of turning prevents skidding of the tires during turns on the ground.

The embodiment of FIG. 15 discloses a single-axle landing gear or truck in which steering of the axle is obtained by a rotatable fore-and-aft extending eccentric shaft.

While only a few methods and a few embodiments of the invention for carrying out the methods have been disclosed, it will be evident that various other modifications are possible in the arrangement and construction of the disclosed steering mechanism by a rotatable truck beam for heavy vehicles and it is accordingly desired to comprehend within the purview of this invention such modifications as may be considered to fall within the appended claims,

We claim:

1. A main landing gear for heavy aircraft having a multiplicity of fore-and-aft landing gear trucks, at least one of said landing gear trucks comprising
   a. an oleo strut b. longitudinally extending truck beam means having a longitudinal axis and fore-and-aft ends,
c. truck beam actuator means for connecting said oleo strut to said truck beam intermediate the ends thereof for rotating said truck beam about its longitudinal axis,
d. fore-and-aft wheel axle means, each axle means having an axis of rotation and wheels rotatably mounted on each of said axle means,
e. fore-and-aft axle bearing means for connecting said fore-and-aft wheel axles to said respective fore-and-aft truck beam ends, and
f. said fore-and-aft axle bearing means being responsive to said truck beam actuator for rotating said fore-and-aft wheel axles in a horizontal plane for preventing scrubbing of tires on said wheels and for reducing turning forces required to steer the landing gear.

2. A landing gear truck for heavy aircraft as recited in claim 1 wherein,
a. one of said axle bearing means comprises canting means for causing said rotation of said truck beam means to be greater than said rotation of at least one of said wheel axles for decreasing steering forces.

3. A landing gear truck for heavy aircraft as recited in claim 1 wherein,
a. said fore axle bearing means comprises canting means for causing said rotation of said truck beam means to be greater than said rotation of at least one of said wheel axles for decreasing steering forces.

4. A landing gear truck for heavy aircraft as recited in claim 3 wherein,
a. said fore axle bearing means has a fore pivotal axis about which said fore wheel axle turns, and
b. said canting means comprises canting of said fore pivotal axis from said horizontal plane for decreasing steering forces.

5. A landing gear truck for heavy aircraft as recited in claim 1 wherein,
a. said fore axle bearing means has a fore pivotal axis and comprises canting means for causing said rotation of said fore wheel axle and for steering.

6. A landing gear truck for heavy aircraft as recited in claim 5 wherein,
a. said fore pivotal axis is canted upwardly from the horizontal plane for decreasing steering forces.

7. A landing gear truck for heavy aircraft as recited in claim 1 wherein,
a. said aft axle bearing means has an aft pivotal axis about which said aft wheel axle turns, and
b. said aft pivotal axis is canted from the longitudinal axis of said truck beam for decreasing steering forces.

8. A landing gear for heavy aircraft as recited in claim 1 wherein,
a. said fore axle bearing means has a fore pivotal axis about which said fore wheel axle turns,
b. said aft axle bearing means has an aft pivotal axis about which said aft wheel axle turns, and
c. both of said pivotal axes being canted from said horizontal plane in a vertical plane for decreasing steering forces.

9. A landing gear for heavy aircraft as recited in claim 8 wherein,
a. both of said fore-and-aft canted pivotal axes are parallel to each other when all wheels are aligned in fore-and-aft directions.

10. A landing gear truck for heavy aircraft as recited in claim 1 for use during a taxiing turn of the aircraft about a center of turning point wherein,
a. said truck beam actuator means is responsive to said fore axle bearing means and said aft axle bearing means for causing the axes of both said fore-and-aft wheel axles to intersect at said center of turning point to prevent skidding of said truck wheels.

11. A landing gear truck as recited in claim 1 wherein,
a. each of said fore-and-aft axle bearing means has a pivotal axis, and b. said pivotal axis of said aft axle bearing means is canted a greater amount from the vertical than said pivotal axis of said fore axle bearing means so that during a taxiing turn of the aircraft about a center of turning point, said fore wheel axle is caused to turn a greater amount than said aft wheel for causing the axes of both said fore-and-aft wheel axles to intersect at said center of turning point to prevent skidding of said truck wheels during a turn of said aircraft.

12. A landing gear truck as recited in claim 1 wherein,
said truck beam means is responsive to said truck beam actuator means for being rotatable about an axis canted to said truck beam means longitudinal axis,
said canted axis of rotation being tilted at an angle to the horizontal plane of said fore-and-aft wheel axles for increasing the steering angle of said wheel axles without increasing the size of said landing gear truck.

13. A landing gear truck as recited in claim 1 wherein,
a. at least one of said fore-and-aft axle bearing means is eccentric to said wheel axles for permitting folding and retraction of said one landing gear truck into a smaller and shallower wheel well.

14. A steerable truck of wheels comprising,
a. two tandem fore-and-aft wheel axles,
a longitudinally extending truck beam interconnecting said fore-and-aft wheel axles, said truck beam having a fore-and-aft axis and being rotatable about said axis,
c. fore-and-aft bearing means for steerably connecting said fore-and-aft axles to said truck beam, and
d. said fore-and-aft axle bearing means being disposed so as to be responsive to rotation of said rotatable truck beam and to steerably rotate said fore-and-aft axles in the same direction and in a horizontal plane for preventing scrubbing of tires on said wheels and for reducing turning forces required to steer the wheel truck.

15. A steerable truck as recited in claim 14 wherein,
a. one of said axle bearing means comprises canting means for causing said rotation of said truck beam to be greater than said rotation of at least one of said wheel axles for decreasing steering forces.

16. A steerable truck as recited in claim 14 wherein,
a. said fore axle bearing means comprises canting means for causing said rotation of said truck beam to be greater than said rotation of at least one of said wheel axles for decreasing steering forces.

17. A steerable truck as recited in claim 16 wherein,
a. said fore axle bearing means has a fore pivotal axis about which said fore wheel axle turns, and
b. said canting means comprises canting of said fore pivotal axis from said horizontal plane for decreasing steering forces.

18. A steerable truck as recited in claim 14 wherein,
a. said fore axle bearing means comprises canting means for causing said rotation of said truck beam to be greater than said rotation of said fore wheel axle for steering.

19. A steerable truck as recited in claim 18 wherein,
a. said fore axle bearing means has a fore pivotal axis about which said fore wheel axle turns, and
b. said fore pivotal axis is canted upwardly from said horizontal plane for decreasing steering forces.

20. A steerable truck as recited in claim 14 wherein,
a. said aft axle bearing means has an aft pivotal axis about which said aft wheel axle turns, and
b. said aft pivotal axis is canted from said horizontal plane for decreasing steering forces.

26. A steerable truck as recited in claim 14 wherein,
a. said fore axle bearing means has a fore pivotal axis about which said fore wheel axle turns,
b. said aft axle bearing means has an aft pivotal axis about which said aft wheel axle turns, and
c. both of said pivotal axes being canted from said horizontal plane in a vertical plane for decreasing steering forces.

22. A steerable truck as recited in claim 21 wherein, a. both of said fore-and-aft canted pivotal axes are parallel to each other when all wheels are aligned in fore-and-aft directions.

23. A steerable truck as recited in claim 14 for use during a turn about a center of turning point on the ground wherein,
 a. said fore-and-aft axle bearing means are responsive to said rotatable truck beam for causing the axes of both said fore-and-aft wheel axles to intersect at said center of turning point to prevent skidding of said truck wheels.

24. A steerable truck as recited in claim 14 wherein,
 a. each of said fore-and-aft axle bearing means has a canted pivotal axis about which the fore-and-aft axles, respectively, turn, and
 b. said pivotal axis of said aft axle bearing means is canted a greater amount from the vertical than said pivotal axis of said fore axle bearing so that during a turn on the ground about a center of turning point, said aft wheel axle is caused to turn a greater amount than said fore wheel axle for causing the axes of both said fore-and-aft wheel axles to intersect at said center of turning point to prevent skidding of said truck wheels during a turn.

25. A steerable truck as recited in claim 14 having,
 actuator means coupled to said truck beam for rotating said truck beam about an axis canted to said horizontal plane for increasing the steering angle of said wheel axis without increasing the size of said steerable truck.

26. A steerable truck as recited in claim 14 for use as a landing gear in an aircraft wherein,
 a. said fore-and-aft axle bearing means are eccentric to said wheel axles for permitting folding and retraction of said steerable landing gear truck into a smaller and shallower wheel well.

* * * * *